2,786,254
United States Patent Office
Patented Mar. 26, 1957

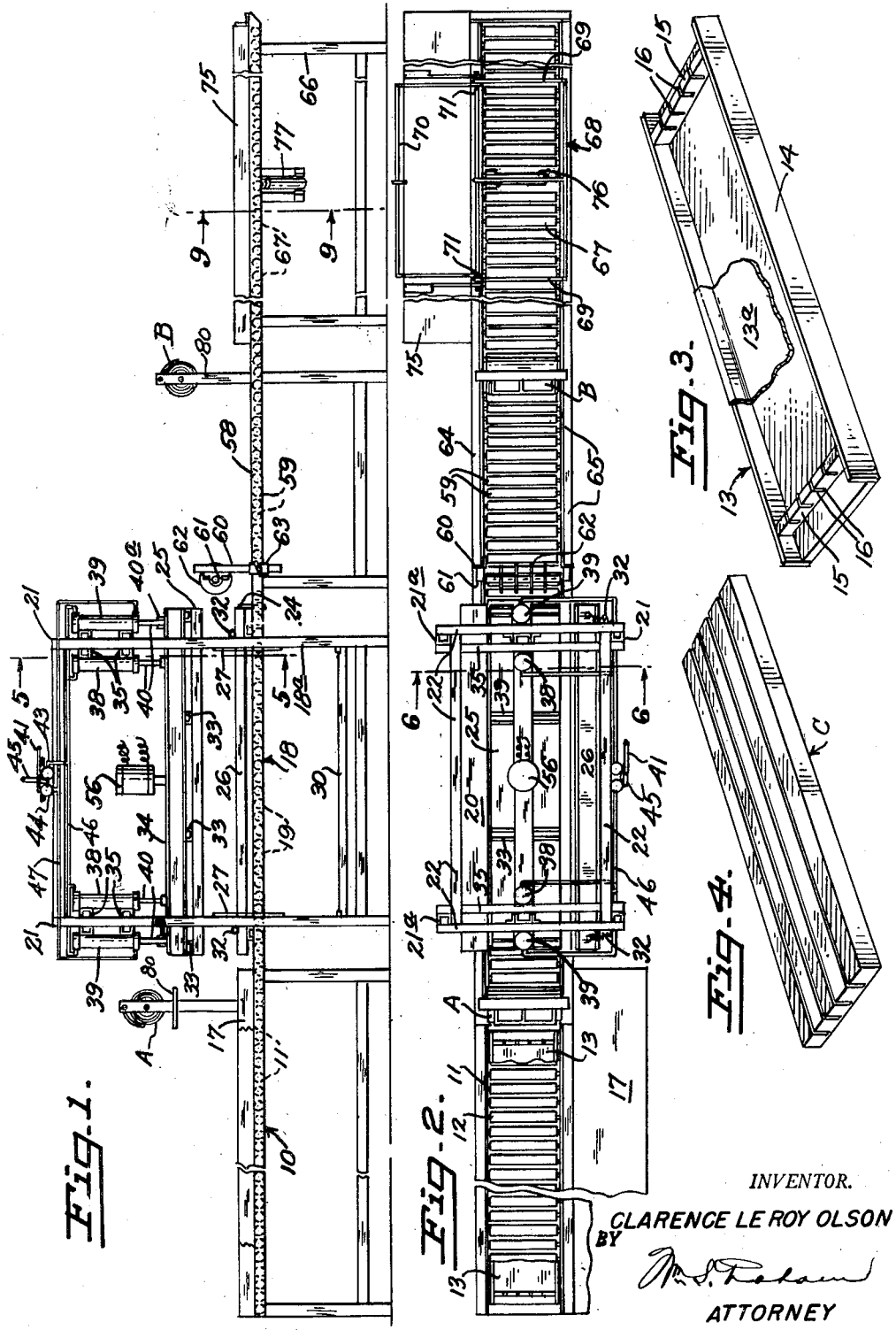

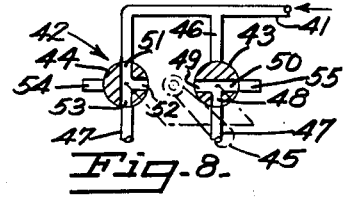
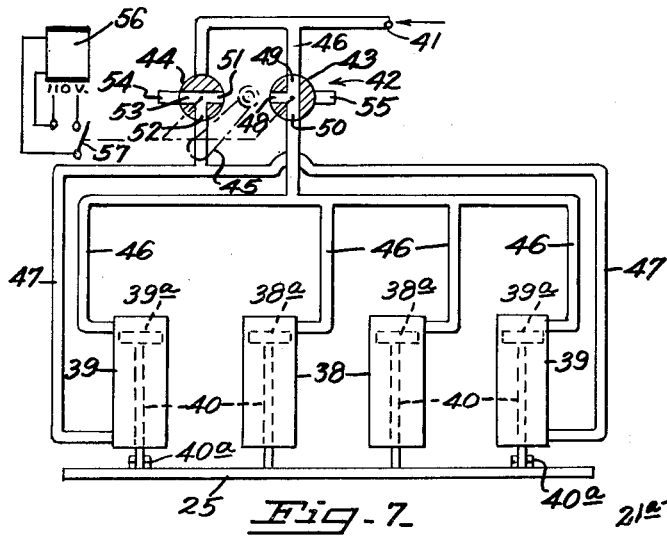
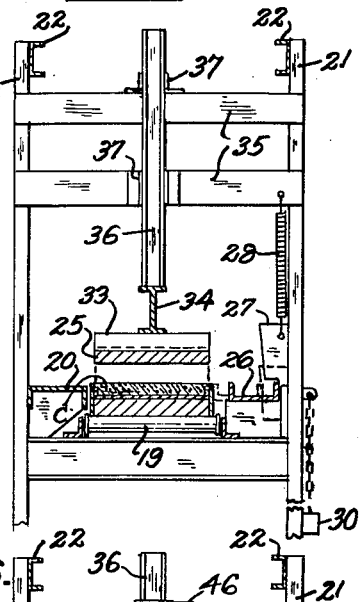
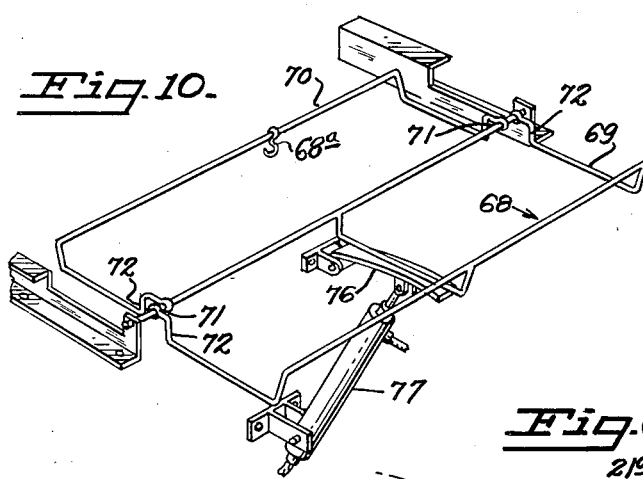
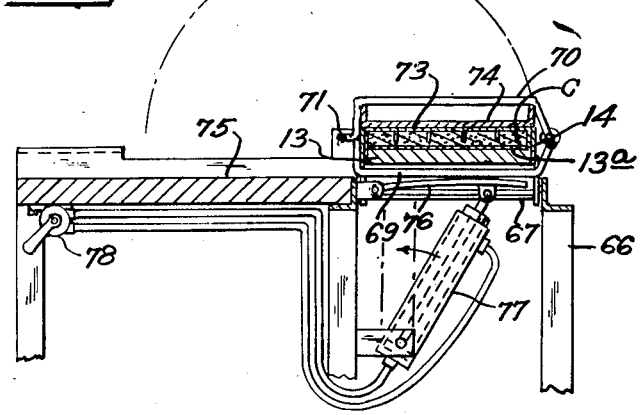
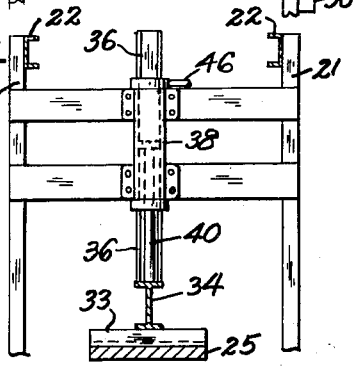
INVENTOR.
CLARENCE LEROY OLSON
BY
ATTORNEY

2,786,254

METHOD AND APPARATUS FOR FORMING CEMENTITIOUS SLABS

Clarence LeRoy Olson, San Francisco, Calif.

Application June 2, 1952, Serial No. 291,195

15 Claims. (Cl. 25—41)

This invention relates to an apparatus for and method of forming cementitious slabs, regardless of whether such slabs be relatively long strips or relatively wide blocks. The invention more particularly relates to such method and apparatus in which pressure and vibrator means are applied to the slabs of cementitious material in course of transit through the apparatus.

The purpose of the invention is to provide a method and apparatus for forming cementitious material into slabs or strips of sufficient thickness to be self-sustaining in body form for use in building construction, and to have the characteristics desirable for the purposes for which the particular product is to be used. For example, if the product is to be a rectangular slab for flooring or wall facing, the cementitious mix would be prepared for a hard and moisture impervious end product, whereas, if the finished slabs or strips were to be employed for artificial lumber, such as sills or sleepers, and the like, the cementitious material would be prepared so that the end product would be nail-penetrable. In either case, the cementitious mix is mechanically manipulated in a manner to accomplish the operations of forming, compressing and vibrating the formed mix for integrating the cement and removal of surplus air and moisture, and suitably slitting it if the end product is desired as strip material.

Briefly described, the invention comprises apparatus for and method of mixing a cementitious aggregate and forming it roughly into a slab of approximately desired size and shape upon a forming pallet board which is first covered with a layer of non-adherent waterproof wax paper, the forming pallet board having side and end walls serving as a forming mold. After molding the plastic mix on the pallet board, the board and plastic formed slab is conveyed to a pressure table or station having pressure and vibrating means where the slab is compressed upon the forming pallet within the forming walls and simultaneously vibrated upon its upper planar face by a suitable vibrating device. If the slabs are to be cut into strips to form artificial lumber such as sleepers for building construction, the board with the plastic slab thereon is next conveyed to a cutting station of a plurality of knives mounted upon an arbor transversely in the path of the moving slab, and thus the slab is cut into a plurality of parallel strips upon the board, preferably leaving a film of thickness of material uncut so that the strips when dried and set are held together to facilitate handling in units of connected strips, the connecting film being readily frangible for separation of the dried and finished strips. After pressure and vibration (and cutting if the end product is to be strips), the slab is transferred to a reversing station or table at which the exposed or upper face of the slab is covered with another layer of non-adherent wax paper, whereupon a second pallet not having forming strips thereon is placed upon the exposed or upper face of the slab with the second non-adherent wax paper therebetween, whereupon reversing means at the reversing table engages both the pallet form containing the slab and the superposed or second pallet board and reverses the planar faces thereof so that the first or forming board is uppermost and may thereupon be removed from the cementitious slab, so that the slab reposes upon the planar face of the second pallet board, whereupon the second board, with the slab thereon, is removed from the apparatus and placed upon a drying rack until the cementitious material is set to its final form and shape for use.

The steps of the process and the structure of the apparatus are more particularly described in the specification herein in connection with the accompanying drawings illustrating one form of apparatus for carrying out the invention, it being understood that variations in form, degree, size and minor details may be resorted to without departing from the invention which is defined in the appended claims.

In the drawings—

Fig. 1 is a longitudinal side elevation of apparatus of this invention.

Fig. 2 is a plan view of Fig. 1.

Fig. 3 is an enlarged perspective view of forming pallet board.

Fig. 4 is an enlarged perspective view of formed slab.

Fig. 5 is an enlarged fragmentary lateral vertical section on line 5—5 of Fig. 1.

Fig. 6 is an enlarged fragmentary view on line 6—6 of Fig. 2 showing detail of pressure cylinders.

Fig. 7 is a diagrammatic view of valves, air conduits and cylinders of Fig. 1.

Fig. 8 is a diagrammatic view of valves at an opperative position varied from Fig. 7.

Fig. 9 is an enlarged fragmentary section on line 9—9 of Fig. 1, transversely through a pair of tables but showing a reversing frame at a closed position of operation.

Fig. 10 is an enlarged perspective view of reversing frame shown in Fig. 2, at open position.

Referring to the drawing in which like reference characters indicate corresponding parts in the several views, there is provided an elongated conveyor means such as the train of conveyor rollers exemplified herein, which for purposes of description, may be divided into four stations described herein as elongated tables for successively forming a plastic cementitious mix into the form and shape of a slab, mechanically pressing and vibrating the formed mix, slitting the formed mix, and reversing the planar faces thereof. Frame supports for the tables may be provided of any suitable type.

The forming table 10 is supported by frame 10a and has a train of conveyor rollers 11 in a horizontal plane and side guide rails 12, the forming table receiving flatly on the rollers thereof a planar forming pallet 13 which has upstanding side walls 14 and opposite end walls 15 for confining the formed mix the upper face of which is open and exposed. The end walls 15 have spaced vertical slots 16 cut therein. A sheet of adhesion resistant wax paper 13a is placed as a liner in the forming pallet before cementitious material is placed therein. Closely alongside the forming table is a convenient work board 17, the upper face of which is at substantially the same plane as the upper edge of side guides 12 and the side walls 14 of the forming pallet, so that the surface of cement mix in the forming pallet may be travelled and any surplus material above the top of the side walls of the forming pallet may be troweled off onto the work board, leaving the cementitious material just level with the top of the side walls of the pallet.

At an end of the forming table is the pressure and vibrating table 18 supported on frame 18a and having conveyor rollers 19 in a horizontal plane similar to and aligned with the rollers of the forming table 10, this table having a very strong reinforcing guide rail 20 at one side edge only, which may be arbitrarily termed the rear edge since normally an operator would stand at the opposite or front side of the table as shown in the elevation of Fig. 1. This guide rail 20 is of substantially the same length as the former pallet and receives considerable pressure, wherefore it is of stout and very substantial material, shown herein as a channel-iron member, the inner face of which is substantially aligned with the inner face of guide rail 12 of the forming table. This pressure table has upright supports substantially at its four corners indicated 21 at the front and 21a at the rear, which together with the overhead longitudinal and lateral crossbars 22, provide a supporting frame for a compressing and vibrating apparatus to be further described.

However, before the compressing and vibrating apparatus is operated, the filled forming pallet 13 is slid on the rollers from forming table 10 to pressure table or station 18 until it overlies the pressure table and has its endwise movement stopped at a proper longitudinal position by any suitable trip-stop 24, to underlie and be positioned precisely longitudinally and transversely relative to a pressure board or mechanical trowel 25 so that the pressure board registers substantially exactly within the walls 14, 15 of the forming pallet board, the positioning of the pallet board being made longitudinally precise by the trip 24, and transversely precise by contact with the under face of guide rail 20 against which the pallet board is pressed by an opposed equally stout and equally elongated clamp bar member 26 which is horizontally and longitudinally parallel with the opposite guide rail 20 and urges the forming pallet against the opposite guide rail responsive to a wedge mechanism mounted on the frame. The wedge mechanism comprises a vertically slidable plate wedge 27 mounted on each of the front uprights 21, and which are spring tensioned upwardly by spring 28 and moved downwardly by chains 29 and treadle 30, the angled cam edges of the wedges engaging the clamp bar member 26 and thus holding the side walls 14 of the forming pallet against bulging during operation of high pressure and vibration of the plastic cement mix on the forming pallet 13, since the pressure is very considerable, but varying with the character of the cement material. Upon completion of the pressure and vibrating operations, the treadle 30 is released and the clamp bar is returned by vertical retraction of the wedges 27 and horizontal retraction of clamp bar 26 responsive to the tension of counter springs 32.

The pressure board 25 which parallelly overlies the planar forming pallet and conveyor is of substantially the same planar dimension as the inner planar dimension of the forming pallet allowing for a trifle of marginal clearance, approximately 1/8 inch, so that excess material and moisture (which is usually of small quantity), may be squeezed out by the pressure and vibration.

The pressure board 25 may be of any suitable construction but for simplicity and rigidity it is here described relatively thick and having channel iron crossbars 33 relatively spaced between its opposite ends upon which is longitudinally mounted an I-beam 34 at approximately the center of the pressure board, the pressure board assembly unit being vertically reciprocal and guided by vertical guide rails 36 which ride in guides 37.

The means for vertically reciprocating and for exerting pressure on the pressure board 25 consists of pressure cylinders suitably mounted fixedly on the elevated portion 21 of the frame, the cylinders being preferably pneumatic, though other pressure means such as hydraulic cylinders would be effective. Four cylinders are illustrated and indicated at 38 and 39, supported by cross thwarts or bars 35. All of the cylinders operate as pressure cylinders perpendicularly against the pressure board 25 through the beam 34, and the two outer cylinders 39 being two-way or both for pressure and retraction. Each of the cylinders has a piston reciprocable therein, indicated 38a and 39a, to which is connected a piston rod 40 which has bearing on the I-beam 34. Each of the piston rods 40 in the two-way retraction cylinders 30 has a secure connection at 40a to the angle iron for retraction purposes. The connection 40a of cylinder 39 comprises one or more nuts threadably adjustable on the piston rod so that the length of the piston rods of the cylinders 39 may be reasonably varied by adjusting the nuts forwardly or rearwardly on the threads, whereby the force of the pressure board assembly on the cement slab may be varied.

The cylinders 38, 39 are operated by an air pressure source 41 through a valve mechanism generally indicated 42. This valve mechanism has two three-way valves 43 and 44 of standard type manually operated by selectively swinging a lever 45 in opposite directions.

Both the valves 43 and 44 communicate with the air pressure source 41 and are synchronized in operation simultaneously by the lever 45 whereby when one valve is open the other valve is closed. The valve 43 is the pressure valve through which pressure is exerted on board 25, and valve 44 is the retraction valve through which the board 25 is retracted from its pressure stroke.

In operation the pressure valve 43 has communication with an air pressure conduit system 46 to the high pressure side above the pistons in each of the cylinders 38, 39, and the retraction valve 44 has communication with a retraction air conduit system 47 to the opposite or low pressure side of the pistons in the two-way retraction cylinders 39. Referring to the diagrammatic view of Fig. 7, to provide a pressure operation or stroke of the pressure board 25, the lever 45 is moved in one direction which operates pressure valve 43 to close its valve port 48 and place its valve passageway and ports 49 and 50 in communication between air source 41 and the pressure conduit system 46 to the high pressure side of the pistons in the cylinders, forcing them downwardly or on a pressure stroke exerted upon the pressure board 25. Simultaneously the same movement of the lever 45 actuates valve 44 to close its port 51 and cut off its ports from communication with the air pressure source 41, and opens its ports 52 and 53 to communication between the retraction conduit system 47 and an exhaust vent 54 whereby entrapped air on the low pressure side of the pistons of the retraction cylinders 39 may be exhausted. No such exhausting of air from the low pressure side of the pistons 38 has appeared to be necessary since that pressure is merely atmospheric. Referring now to Fig. 8, after pressure has been exerted sufficiently upon the pressure board 25 and the cementitious material thereunder, the pressure board is retracted by movement of lever 45 to an opposite position, which closes exhaust 54 and opens retraction valve 44 to communication between air pressure source 41 and the retractive conduits 47 by placing the valve passageway and ports 51 and 53 in communicating relation with air source 41 and retraction conduits 47, and simultaneously closing pressure valve 43 to communication with the air source 41 by closing its port 49 and placing its passageway and ports 48 and 50 in communication between the pressure conduit system 46 and an exhaust outlet 55. By this last mentioned operation the air source pressure 41 is applied below or on the low pressure side of the pistons 39a in cylinders 39, thus raising them and the connected pressure board 25, the resistance of air on the opposite or pressure side of the pistons being simultaneously exhausted through the conduit system 46, valve ports 48, 50 and exhaust outlet 55. It is to be understood that a single pair of relatively larger two-way cylinders may be employed instead of the four cylinders shown herein, but the four cylinders are preferred because a greater capacity is desired for pressure against the cement material than for the mere retraction of the pressure board.

To closely integrate the cementitious material and dissipate occluded air and free moisture, it is desirable to work the material with a kneading agitation at its open or exposed planar surface. For this purpose a suitable vibrator 56 preferably of electrical type is provided mounted upon the longitudinal bar 34 for vibration of the pressure board 25 and thereby vibrate the cementitious material perpendicularly to the open exposed face thereof simultaneously with the exertion of pressure by the pressure board on said exposed face of the material. This vibrator may be placed in operation by a switch manually operated by the operator but preferably is wired to a switch 57 which is closed for contact when the lever 45 opens valve 43 for a pressure stroke of the cylinder pistons, and which breaks such contact when the lever closes valve 43 and opens valve 44 to retract the pressure board.

The treadle 30 is maintained depressed during the vibration and pressure on the cement material so that the forming pallet may be firmly held under the pressure board during such pressure and vibration, and the side walls 14 of the forming pallet reinforced.

When the pressure and vibration of the material is completed and the pressure board raised, the forming pallet with the compacted cementitious material therein is conveyed on the rollers to the next successive table. If the material is to be cut into strips for rafters or sleepers, the next successive table is a slitting or cutting table 58 which likewise has a train of rollers 59. At the end of the slitting table adjacent the pressure table this slitting table has at opposite sides upstanding supports 60 for transverse arbor 61 upon which is mounted a plurality of relatively spaced freely rotatable disc knives 62, the supports 60 being vertically adjustable in clamps 63 so that the arbor and knives may be sufficiently lowered so that the blades slit strips in the formed slab of cement on the forming pallet, or may be raised so that the knives do not contact the slab material in the event that uncut slabs are desired. By lowering the knives into cutting relation the forming pallet may be suitably propelled or manually slid from the pressure table along the rollers of the slitting table and under the disc knives 62 which cut the material into strips, the knives being properly spaced to enter and cut the slab bodies by passing through the slits 16 at opposite ends of the forming pallet 13. It is preferred that the cut slit in the formed slab shall not be completely through the slab, but shall leave a substantial thickness of film, say about ⅛ inch, uncut since this facilitates handling the shipping and storage after the material is set and dry, and is readily frangible to divide the slab into strips at a job of installation. While in transit on the slitting table 58 the forming pallet is maintained aligned in its path by any suitable means, such as by guide rail 64 at the rear edge of the table and leaf-spring 65 at the front edge of the table, which hold the pallet board firmly against the rear guide rail without too much friction in sliding the board past the slicing knives.

If the pressed cement material is not to be cut to strips but is to remain an integral slab the operation and the cutting table may be by-passed. But whether or not the material is cut to strips, the forming pallet board and slab thereon is conveyed to a reversing table 66 having similar roller train 67. When the forming pallet and slab reach this table a sheet of non-adherent or wax paper is spread upon its upper exposed face. This table has mechanism for reversing the planar faces of the pallet and formed material thereon, comprising a skeleton clamp frame 68 which has a pair of skeleton frame panels 69 and 70 hingedly connected at one side rail of the table as at 71, the respective frame panels being relatively offset from the plane of the axis of the hinge, as at 72, so that they are spaced as a cage to receive and support between them the forming pallet having thereon the formed slab C with overlying layer of non-adherent wax paper 73 and a second or storage board 74 overlying the cement slab and paper.

The offset in the lower member of the frame panel permits it to extend across the table between rollers 67 and below the plane of the upper face of the rollers so that the forming pallet 13 may slide upon the rollers and overlie said lower frame panel, at which position the layer of wax paper is applied over the exposed planar face of the cementitious slab and the second or storage board 74 superposed thereupon, the upper frame panel 70 being hingedly open to the position shown in Fig. 10, and then closed as shown in Fig. 9, to enclose the assembly, and secured by a lock 68a if desired, and then the entire skeleton panel frame including the board assembly therein may be hingedly lifted from the reversing table 66, its planar faces reversed on the hinges and the closed frame and board assembly turned to rest upon an auxiliary table 75, whereupon the skeleton frame may be opened and the forming pallet 13 (which is then uppermost), lifted from the formed cement slab, leaving the slab reposing upon the wax paper 73 on the second or storage board.

Means are preferably provided to assist in the reversal of the faces of the boards at the reversing table, since the two boards with the cementitious material therebetween are quite heavy, said assisting means comprising a slightly arcuate lever 76 moved by an air cylinder and piston 77 operable by an air source and valve 78.

At this point of operation the mechanical operation in making the slabs is complete, and the storage board 74 with reversely faced slab thereon may be removed to a drying rack for the slab to set and harden.

The paper sheets of non-adherent paper may be supplied from any convenient source, and have been shown herein by way of example as conventional conveniently located rolls thereof indicated A and B, supported on any suitable brackets 80.

The steps in the method have been described in connection with the operation of the apparatus, except that the apparatus does not disclose a means of mixing a plastic cementitious mix; obviously the method would include as a first step the mixing of a suitable plastic cementitious mix to place in the forming pallet.

Having described the invention, I claim:

1. A method of making cementitious slabs with the aid of a conveying means, comprising the steps of forming a plastic cementitious mix and confining it in substantially a final finished planar shape with one planar face exposed, conveying the formed and confined mix to a pressure station, subjecting the formed mix at said station to pressure on the exposed planar face while maintaining it confined, vibrating the formed mix upon its exposed planar face while it is so confined and under pressure, and drying the formed slabs.

2. A method of the character described having the steps of claim 1 and including the steps of conveying the pressed and vibrated formed mix to a reversing station, placing a receiving board upon the exposed face of the formed mix, and then simultaneously removing the confined formed mix from the conveying means while reversing the planar faces of the formed mix, and releasing it from confinement.

3. A method of the character described having the steps of claim 1 and including the step of slicing the formed and confined mix into strips while conveying it and after the said pressure and vibration thereof.

4. A method of the character described having the steps of claim 1 and including the steps of slicing the formed and confined mix to strips from the open exposed face thereof while conveying it, and leaving the strips connected by a relatively thin film of the mix at its opposite planar face.

5. In a method of making cementitious slabs with the aid of a conveying means, the steps of forming a plastic cementitious mix and confining it non-adherently in substantially a final finished planar shape and with a planar face exposed, conveying the formed and confined mix to a pressure station, subjecting the formed mix to pressure on the exposed planar face thereof while simultaneously vibrating the formed mix perpendicularly upon its exposed planar face while it is so confined and under pressure at said station, and releasing the pressed and vibrated formed mix from confinement, and maintaining it non-adherently resting on its said exposed planar face while drying.

6. A method of the character described having the steps of claim 5 and including the step of slicing the formed and confined mix to strips while conveying it and after the said pressure and vibration thereof.

7. A method of the character described having the steps of claim 5 and including the steps of slicing the formed and confined mix to strips from the open exposed face thereof while conveying it and after the said pressure and vibration thereof, and leaving the strips connected by a relatively thin film of the mix at its opposite planar face.

8. A method of the character described having the steps of claim 5 and including the steps of slicing the formed and confined mix to strips from the open exposed face thereof while conveying it and after the pressure and vibration thereof, and removing it from the conveying means while supporting its exposed planar face upon a planar receiving board.

9. Apparatus for making cementitious slabs comprising a conveyor means in a horizontal plane for receiving and conveying a forming pallet board flatly thereon, said conveyor means having intermediate its ends a gap for a pressure and vibration station, means in the gap at said station for exerting pressure on the upper planar face of a cementitious mix on the pallet board and means for vibrating said mix at the upper face thereof simultaneously with the pressure thereon.

10. A device of the character described having the elements of claim 9 and in which there is a reversing station in the conveyor means successively after the pressure and vibrating station, and means at said reversing station for receiving the forming pallet and reversing the planar faces thereof, said last mentioned means comprising a pair of relatively hinged frame members providing a cage for receiving the pallet therein, said cage being hingedly swingable for removing the pallet from the conveyor.

11. A device of the character described having the elements of claim 9 and in which there is successively a slicing station in the conveyor means and a reversing station after the pressure and vibrating station, means at said slicing station for slicing the cementitious mix into strips on the pallet board and means at said reversing station for receiving a forming pallet and reversing the planar faces thereof, said last mentioned means comprising a pair of relatively hinged frame members providing a cage for receiving the pallet therein, said cage being hingedly swingable for removing the pallet from the conveyor.

12. Apparatus for making cementitious slabs having the elements of claim 9 and in which there is a slicing station in the conveyor means successively after the pressure and vibrating station, and means overlying the conveyor at said slicing station for slicing the cementitious mix into strips on the pallet board, said slicing means being spaced from the conveyor sufficiently to leave a film of cementitious mix connecting the strip on the pallet board.

13. In an apparatus for making cementitious slabs having a conveyor means for receiving and conveying a forming pallet, the combination therewith of a stationary pressure and vibrating means intermediate the ends of the conveyor, comprising a pressure board overlying the conveyor, means for vibrating said pressure board, means for pressing the board upon an exposed planar face of a cementitious mix on a pallet on the conveyor and means for actuating the vibrator means simultaneously with the pressure of the board on the cementitious mix, and retracting means to lift the board from such pressure on the cementitious mix.

14. A device of the character described having the elements of claim 13 and in which the means for exerting pressure on the pressure board comprises piston cylinders operable alternately for respectively and successively exerting pressure on the board, and retracting the pressure board from such pressure, and the vibrator means vibrates the pressure board upon the planar face of the cementitious mix on the pallet.

15. A device of the character described, having the elements of claim 13 and in which there is a slicing means overlying the conveyor means successively beyond the pressure and vibrating means for slicing the pressed and vibrated cement mix into strips, said slicing means including rotary disc knives relatively spaced transversely of the conveyor, the circumferential slicing edge of said knives being elevated above the conveyor sufficiently for the pallet to slide thereunder and leave a film of the cementitious slab unsliced adjacent to the face of the pallet.

References Cited in the file of this patent

UNITED STATES PATENTS

| | | |
|---|---|---|
| 509,976 | Van Stavoren | Dec. 5, 1893 |
| 1,169,963 | Keenan | Feb. 1, 1916 |
| 1,814,172 | Martinet | July 14, 1931 |
| 2,029,365 | Gelbman | Feb. 4, 1936 |
| 2,047,356 | Boyle | July 14, 1936 |
| 2,147,836 | Gaskell | Feb. 21, 1939 |
| 2,193,847 | Strong | Mar. 19, 1940 |
| 2,298,446 | White | Oct. 13, 1942 |
| 2,319,778 | Fiske | May 25, 1943 |
| 2,341,012 | Billman et al. | Feb. 8, 1944 |
| 2,496,016 | Nelson | Jan. 31, 1950 |
| 2,505,419 | McCan | Apr. 25, 1950 |
| 2,581,993 | Willey et al | Jan. 8, 1952 |
| 2,583,597 | Ryner | Jan. 29, 1952 |